United States Patent [19]

Slicker

[11] Patent Number: 5,404,301

[45] Date of Patent: Apr. 4, 1995

[54] METHOD AND APPARATUS OF VEHICLE TRANSMISSION CONTROL BY ASSURED MINIMUM PULSE WIDTH

[75] Inventor: James M. Slicker, West Bloomfield, Mich.

[73] Assignee: Eaton Corporation, Cleveland, Ohio

[21] Appl. No.: 72,486

[22] Filed: Jun. 7, 1993

[51] Int. Cl.⁶ .................................................. G06F 15/50
[52] U.S. Cl. ........................... 364/424.1; 364/426.03; 364/424.01; 192/3.3; 192/3.58; 477/138; 477/131; 477/161
[58] Field of Search ............ 364/424.1, 431.1–431.12, 364/424.01, 426.03; 192/3.3, 3.58, 35, 58, 85, 103, 57, 0.052, 0.073; 74/866, 867, 868, 869, 335, 733.1; 73/168, 37, 40, 46; 180/197, 167; 477/62, 138, 131, 80, 132, 161, 149, 148, 163, 129

[56] References Cited

U.S. PATENT DOCUMENTS

| | | | |
|---|---|---|---|
| 3,740,615 | 6/1973 | Vigini | 361/159 |
| 4,009,695 | 3/1977 | Ule | 364/431.07 |
| 4,021,712 | 5/1977 | Ishihara et al. | 74/866 |
| 4,102,222 | 7/1978 | Miller et al. | 74/866 |
| 4,131,325 | 12/1978 | Bayliss | 303/93 |
| 4,321,946 | 3/1982 | Paulos et al. | 340/635 |
| 4,373,697 | 2/1983 | Phelps | 251/129 |
| 4,550,953 | 11/1985 | Bartholomew | 303/15 |
| 4,779,489 | 10/1988 | Haley | 74/844 |
| 4,843,902 | 7/1989 | Patton et al. | 74/335 |
| 5,048,329 | 9/1991 | Marchini | 73/168 |
| 5,063,813 | 11/1991 | Lentz | 74/866 |
| 5,079,971 | 1/1992 | Yoshimura et al. | 477/161 |
| 5,115,395 | 5/1992 | Petzold | 364/424.1 |
| 5,119,683 | 6/1992 | Deutsch et al. | 73/861 |
| 5,197,583 | 3/1993 | Sakai et al. | 192/35 |

Primary Examiner—Kevin J. Teska
Assistant Examiner—Jacques H. Louis-Jacques
Attorney, Agent, or Firm—Young, MacFarlane & Wood

[57] ABSTRACT

Pulse frequency modulation is used to control brakes and clutches which are operated by fluid pressure actuators controlled by electrically actuated solenoid valves. Short pulse periods for all duty cycles are generated by feedback from the solenoid valve or from the actuator. In one circuit an electrical control triggers a flip-flop which starts solenoid current. Solenoid movement results in back-emf and its effects on the solenoid flux field or current is detected and used as a feedback signal to reset the flip-flop to thereby turn off the current as soon as the valve is operated. In another circuit, a computer control emits a command for a certain pulse period. Actuator pressure or position is monitored to produce a feedback signal to the computer. If the signal is not received, the pulse period is increased for the next pulse command so that a sufficient pulse period will be found. If the magnitude of the actuator response exceeds a threshold, the pulse period is decreased for the next pulse command. Pulse width modulation may also be improved by the same technique for minimizing the pulse period at the lowest duty cycles and yet assuring actuation.

25 Claims, 4 Drawing Sheets

METHOD AND APPARATUS OF VEHICLE TRANSMISSION CONTROL BY ASSURED MINIMUM PULSE WIDTH

FIELD OF THE INVENTION

This invention relates to the control of torque transmitting devices in automotive vehicles and particularly to a method and apparatus for such control through electrically operated fluid actuators.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and a gear train with hydraulically actuated clutches and brakes for selecting the final drive ratio between the engine shaft and the drive wheels. This gear selection is based upon engine speed, vehicle speed and the like. Another type of transmission, which is for heavy trucks, employs an automatic friction clutch instead of a fluid torque converter. Such a transmission and its clutch control is further described in U.S. patent application Ser. No. 772,204, filed Oct. 7, 1991 and entitled "Closed Loop Launch and Creep Control for Automatic Clutch", and U.S. patent application Ser. No. 772,778, filed Oct. 7, 1991 and entitled "Closed Loop Launch and Creep Control for Automatic Clutch with Robust Algorithm", which are assigned to the assignee of this invention.

The usual technique for controlling the various brakes and clutches in the transmissions has been through a fluid actuator, usually hydraulic but which can be pneumatic, which is supplied from a source of fluid pressure through a solenoid valve operated by an electronic control. Such controls determine the rate of actuation to achieve smooth and efficient torque transfer during the transition between engaged and disengaged states. In particular, such controls use pulse width modulation to determine the rate of actuation; pulses are emitted at a fixed frequency and the pulse width is varied in proportion to the desired duty cycle. Rapid actuation is thus afforded by a large pulse width. A result of that mode of control is that each large pulse width results in a large increment of actuator movement so that fine resolution or smooth movement is not possible where a moderate or a large actuation rate is required. Further, slow actuation requires a minimum pulse width. If an initial minimum width is preset to be large enough to surely cause actuation, it will be larger than the minimum required width. Otherwise it is necessary to begin near zero pulse width and increment the pulse width at each scheduled pulse event resulting in a time delay until an effective pulse width is attained. Such a time delay, when applied to a closed loop control can cause instability.

SUMMARY OF THE INVENTION

It is therefore an object of the invention to smoothly control brake and clutch operation in vehicle transmissions or other torque transmitting arrangements by a fine resolution control, thereby avoiding large actuation increments.

It is proposed here that a better mode of control is to use pulse frequency modulation wherein pulse widths are always small and the frequency varies to produce the desired duty cycle. The small pulse widths result in small increments of actuator movement. For the smoothest operation it is preferred to select the smallest pulse widths or pulse periods which the equipment will accommodate.

It is also proposed that control by pulse width modulation by improved by selecting the smallest possible pulse width for the lowest duty cycles.

To be assured that the smallest practical pulse widths are implemented and that the system responds to each pulse, it is further proposed to verify a response to each electrical pulse. Then it can be established that the pulse is not too small, or the pulse width can be controlled by verification feedback. One way to verify a response is to detect back-emf which is generated in the solenoid of the valve upon movement of the solenoid armature or the valve due to the change of flux field by the movement. The back-emf is detected by a separate coil in the solenoid armature or by detecting a change in solenoid actuating current. Other ways to verify response to a solenoid driving pulse are to detect movement of the actuator or to detect a change in actuator pressure.

A hardware technique to generate a short pulse which is just long enough to assure solenoid valve operation is to initiate a pulse signal, turn on a solenoid driver by the signal, verify the response, and turn off the driver when the verification is received. Thus the pulse will have a minimum period, yet to operation is certain. In this case, it is preferred to verify the response by detecting back-emf; the detection is instantaneous and the implementation is simple.

Where a microcomputer based circuit is used for controlling the solenoid, a software technique is useful for producing a short pulse. A pulse having an initially programmed period is generated and applied to the solenoid; if that is not sufficient to trigger a verification signal the pulse period is increased for the next pulse, and so on until the response occurs. Whenever the pulse period is sufficient to yield a response, that period is used for the subsequent pulse. The magnitude of response is compared to a threshold value, and the pulse period is reduced if the threshold is exceeded. In this embodiment, it is preferred to use actuator position or pressure detection for the verification.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description of transmission control is based on an example of one type of control which uses an automatic friction clutch as the input to a gear set. The invention, however is equally applicable to other transmission implementations where fluid pressure is used to actuate a brake or clutch to effect or control torque transmission. The description is couched in terms of pressure increases, but pressure decreases are controllable in the same manner. The term "torque transmitting device" is sometimes used to mean either brake or clutch.

Figure 1:
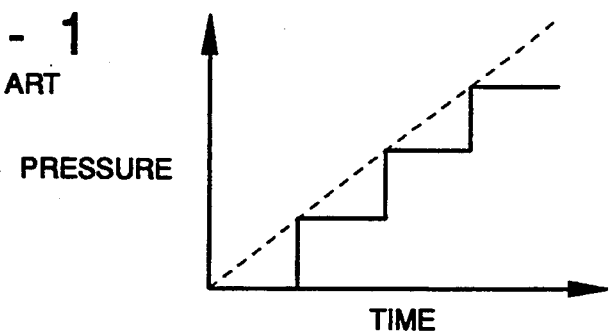
FIGS. 1 and 2 are graphs of pressure increase illustrating the effects of pulse width modulation and pulse frequency modulation, respectively.
Figure 2:
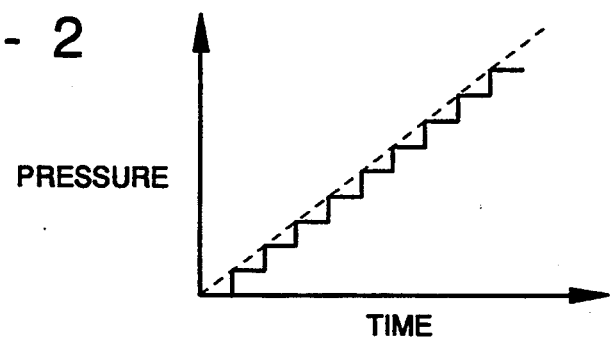

FIGS. 1 and 2 are graphs of pressure increase illustrating the effects of pulse width modulation and pulse frequency modulation, respectively. The modulated signal turns a solenoid valve on and off, the percentage of on time being expressed as the duty cycle. Each pulse provides valve actuation force which is sustained as long as the pulse endures. The overall rate of pressure increase depends on the solenoid duty cycle and is the same for each case. For pulse width modulation, the pulses occur at a fixed frequency and the width varies from a short pulse at low duty cycles to longer pulses for higher duty cycles. Since there is a practical lower limit to the pulse widths, there is also a minimum value for widths at higher duty cycles; that is, if the minimum width occurs at 1% duty cycle, the width at 50% duty cycle must by 50 times the minimum width. A moderate duty cycle produces large steps in pressure increase as shown in FIG. 1, resulting in coarse resolution. Higher duty cycles result in larger step sizes and the same frequency of increases.

Pulse frequency control uses a uniform pulse width and changes the frequency to vary the duty cycle. To achieve small pressure increments, as shown in FIG. 2, a small pulse width is selected and the pulse widths or periods are substantially equal at all frequencies. To obtain high duty cycles, high frequencies are used. The result is a smooth fine resolution of pressure change allowing for improved control of transmission functions.

Figure 3:
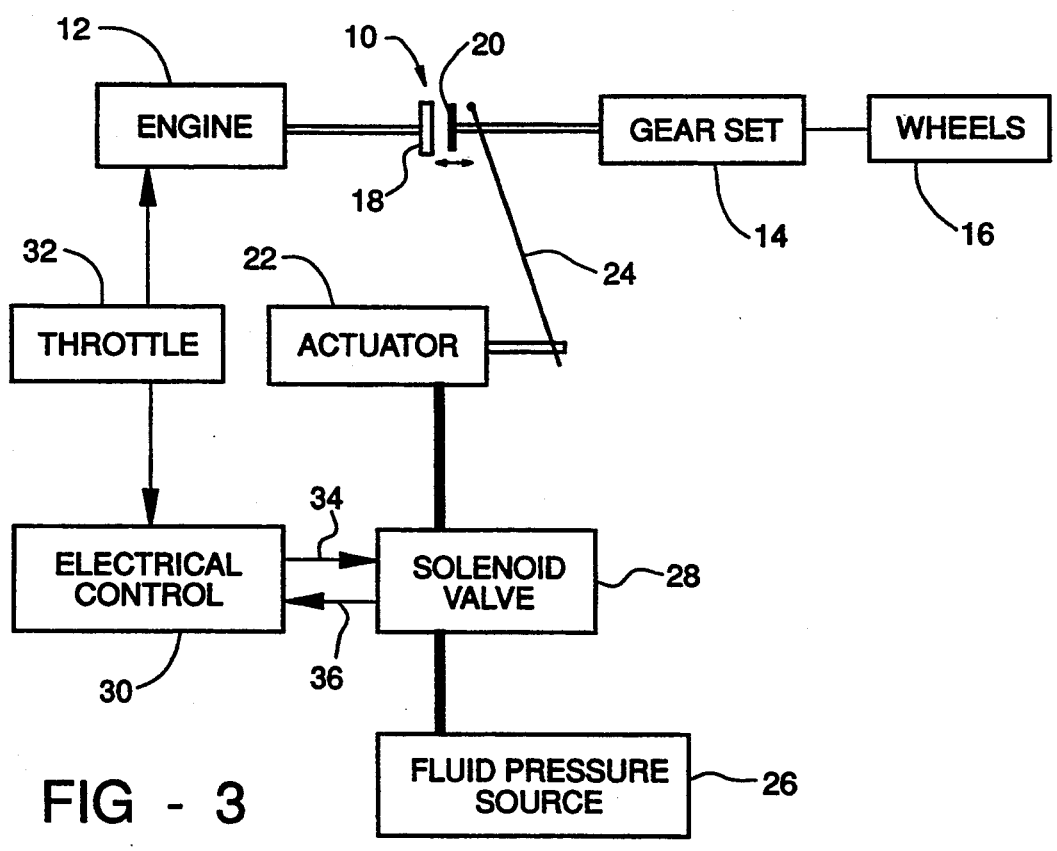
FIG. 3 is a block diagram of a transmission control according to the invention.

FIG. 3 shows an electrically controlled friction clutch 10 connecting an engine 12 to a gearset 14 which drives vehicle wheels 16. The clutch 10, which may actually comprise many plates, is depicted as a fixed plate 18 and a movable plate 20 which is movable into engagement with the fixed plate. An actuator 22 controls the position of the movable plate 20 via a control lever 24. The actuator comprises a pneumatic or hydraulic linear motor supplied by a fluid pressure source 26 through a solenoid valve 28. Small changes in the actuator movement or force depend on admitting fluid to the actuator in small increments. An electrical control 30 under the influence of a throttle pedal 32 determines the required action of the clutch 10 and produces the pulse frequency modulated signal to effect the duty cycle of the solenoid valve which will achieve the proper clutch operation. Lines 34 and 36 couple the electrical control 30 and the solenoid valve 28.

To achieve to full benefit of the pulse frequency modulation method, the pulse width should be as small as possible consistent with solenoid requirements; that is, the pulses must not be so short that the solenoid valve does not respond to every pulse. A technique for assuring that the pulse periods are just long enough to actuate the valve comprises applying energizing current to the solenoid, developing a feedback signal by detecting movement of the solenoid armature or the valve, and then terminating the current. Thus valve actuation is assured and the pulse does not extend beyond the minimum actuation time. Two circuits are presented here for carrying out such action.

Figure 4:
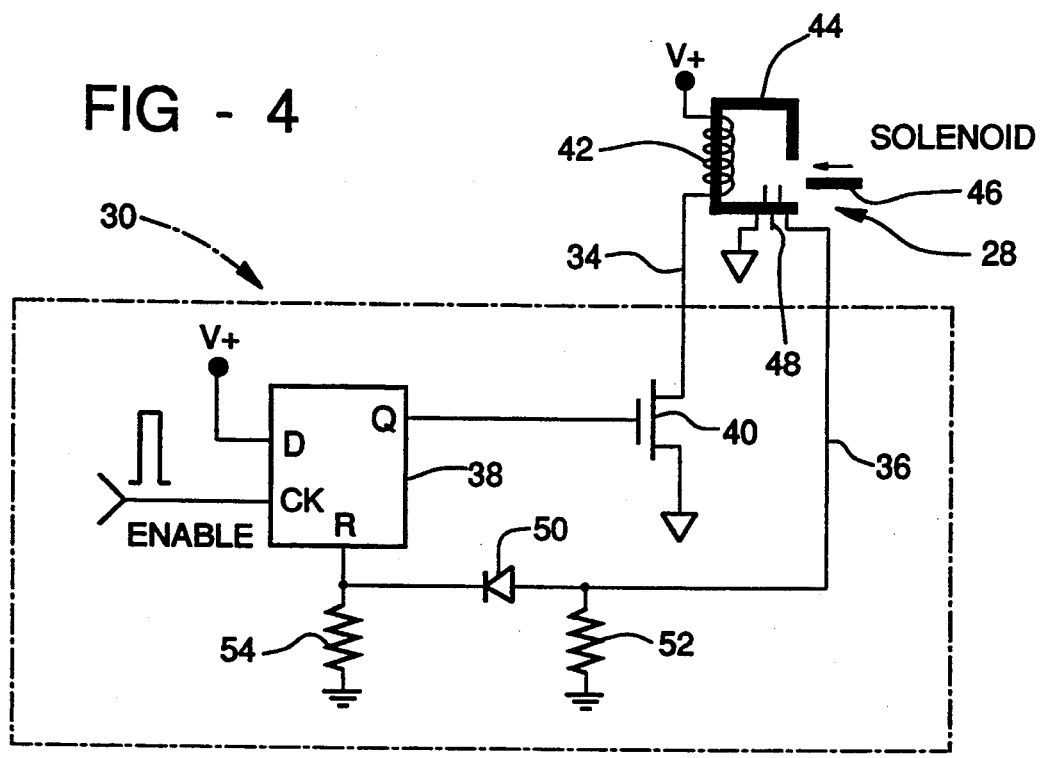
FIGS. 4 and 5 are schematic diagrams of circuits for use with the control of FIG. 3.

One circuit for minimum pulse period control is shown in FIG. 4. A portion of the electrical control 32 comprises a D flip-flop 38 having its data input connected to a constant voltage source V+, its clock input coupled to a frequency controlled signal for duty cycle control, and its Q output connected to the gate of a driver FET 40. The solenoid coil 42 of the solenoid valve has one side connected to voltage V+ and the other connected through line 34 to the FET 40, so that the pulse period of solenoid current is the same as that of the Q output. The coil 42 is wound on a core 44 and a movable armature 46 (coupled to the valve, not shown) is positioned to respond to flux within the core. Armature movement creates a flux change which is reflected in the coil 42 as back-emf. A sensor winding 48 on the core 44 also responds to the flux change to produce a signal corresponding to the back-emf. The winding 48 is coupled through a diode 50 to the reset terminal of the flip-flop 38. Each side of the diode 50 is coupled to ground by resistors 52 and 54. In operation, the input pulse applied to the clock input triggers the flip-flop operation, causing the Q output to go high and the FET to conduct. Current through the winding 42 causes movement of the armature 46 and the resulting back-emf generated in the sensor winding 48 applies a signal to the reset terminal of the flip-flop, terminating the Q output and the current through the coil 42. The input pulse applied to the clock input then must be shorter than the period of the Q output.

Figure 5:
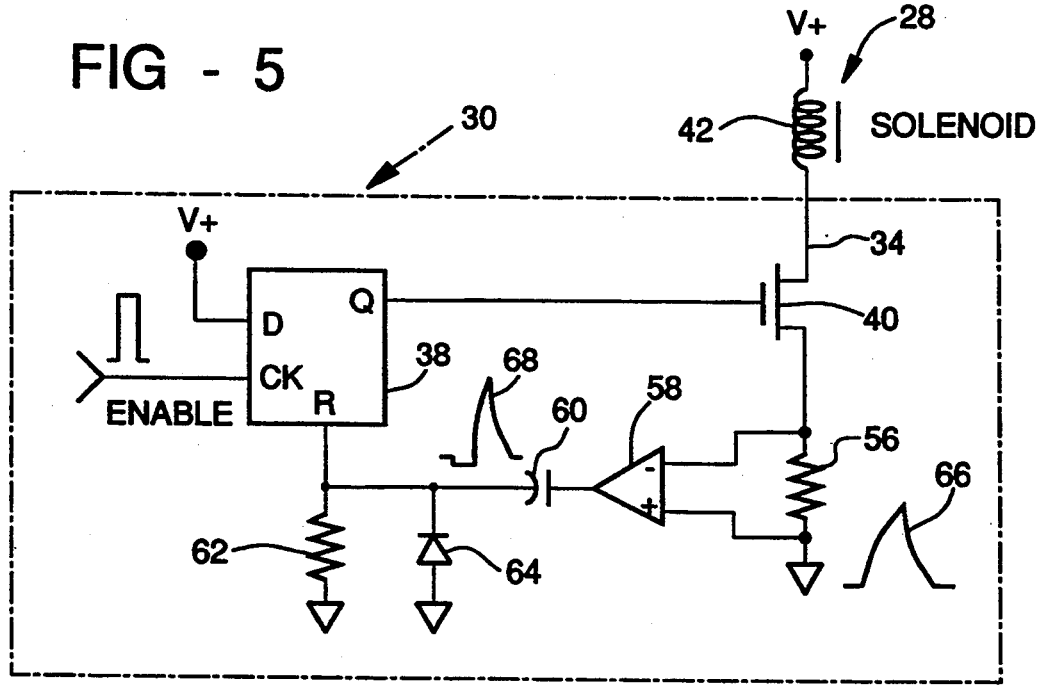

The second circuit for minimum pulse period control is shown in FIG. 5 and uses a D flip-flop 38 and a FET 40 like that of the previous circuit to initiate the current through the coil 42, but instead of using a separate sensor winding, it senses the change of the coil current which is caused by the back-emf. The second line 36 connecting the control 30 with the solenoid valve is not required. The FET 40 is connected to ground through a resistor 56. An inverting amplifier 58 has its inputs connected across the resistor 56 and its output connected to ground through a differentiator circuit comprising a capacitor 60 and resistor 62 in series. The junction of the resistor and capacitor is connected to the reset terminal of the flip-flop 38. A clamping diode 64 coupled across the resistor prevents a voltage signal from going more than one diode drop below ground potential. The operation is illustrated by the current waveform 66 through the resistor 56, and the differentiator voltage waveform 68 applied to the reset terminal. The coil current is initiated by a very short pulse to the clock input of the flip-flop 38. As the coil current 66 rises the amplifier produces a negative signal which is clamped to a small value in the differentiator. When armature movement causes a small back-emf signal the current is reduced, and the differentiator quickly responds by producing a positive pulse in waveform 68 which is sufficient to reset the flip-flop 38. The resulting change of the FET state causes the coil current to continue its decrease to zero level. Like the circuit of FIG. 4, the valve actuating pulse width will be the minimum required for reliable solenoid valve operation and will be the same for the frequency range required for operation up to 100% duty cycle.

Figure 6:
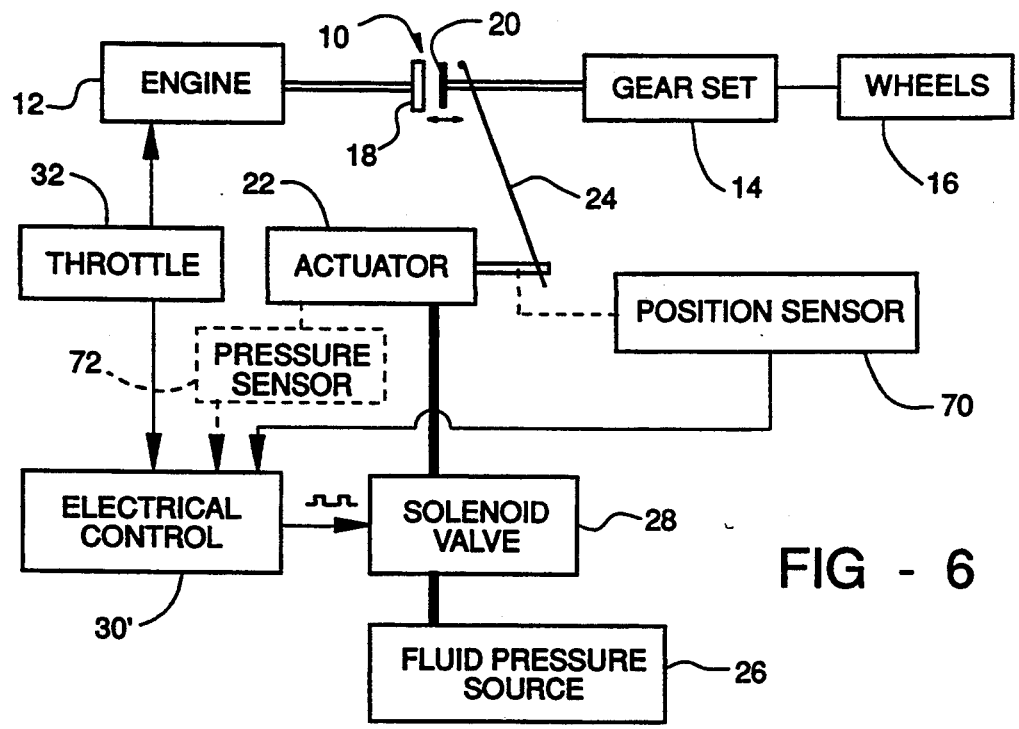
FIG. 6 is a block diagram of a transmission control according to another embodiment of the invention.

FIG. 6 shows another system for controlling the clutch actuator, using a microcomputer based controller in the electrical circuit. The drive train 10–16 is the same as for the FIG. 3 system and the actuator 22, solenoid valve 28, pressure source 26 and throttle control 32 are also the same The electrical control 30' however is computer based, and runs a program for producing the minimum pulse width for actuating the solenoid valve and another program for determining the frequency of pulses required to obtain the desired duty cycle. The control 30' needs information verifying the valve operation. The information is provided by an actuation parameter responsive to the admission of fluid to the actuator. The parameter is generated by a position sensor 70 mechanically coupled to the actuator 22 or to the clutch 10 which detects movement of the actuator or of the clutch, and sends a feedback signal to the control 30'. Alternatively, a pressure sensor 72, shown in broken lines, is coupled to the actuator 22 and senses pressure changes in the actuator and sends a feedback signal to the control 30'. Either the position or pressure feedback signal, when received pursuant to a pulse command, verifies that the valve has been operated. The feedback signal can then be used to signify that the pulse command has been successfully executed. Here the pulse signal from the controller commands a pulse period. Initially a preprogrammed value is set as the pulse period. If the feedback signal does not occur, a longer period is chosen for the next pulse, and so on until the period is sufficiently large for reliable solenoid operation.

Figure 7:
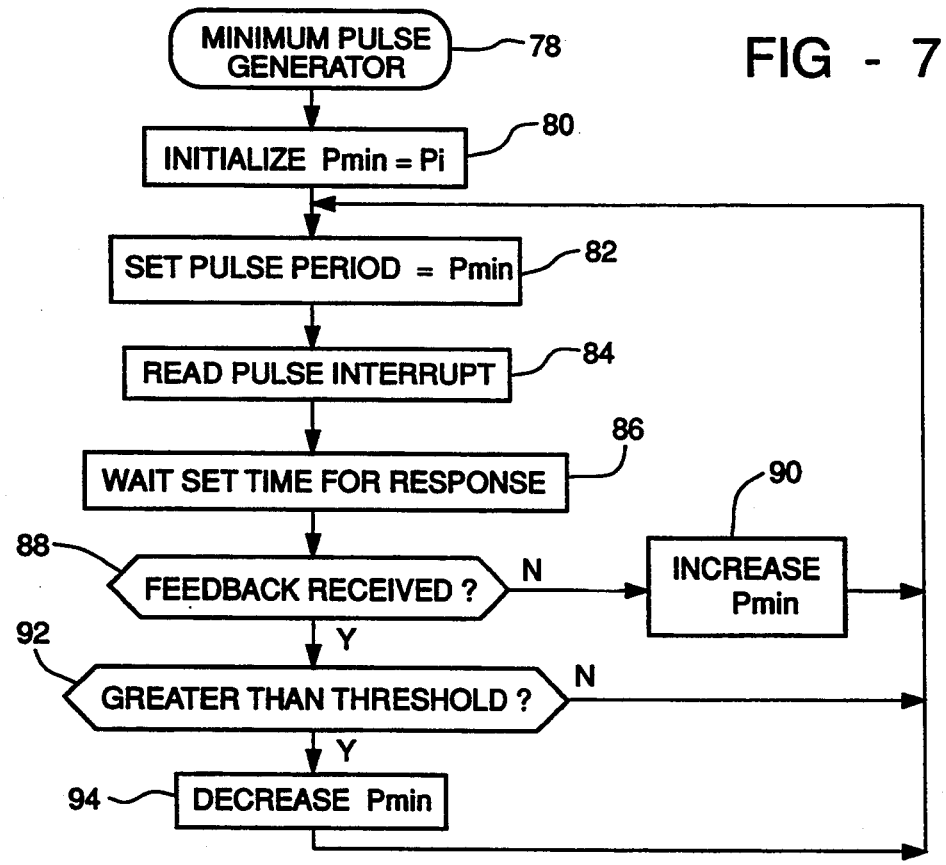
FIG. 7 is a flow chart representing a computer program employed by the control of FIG. 6.

The flow chart of FIG. 7 illustrates an exemplary minimum pulse generator routine 78 for control operation and determination of the pulse period. The frequency or timing of each pulse is separately determined by the control 30' and an interrupt is generated for each pulse event. The first step 80 is to initialize a value Pmin to a period Pi expected to be sufficient for solenoid actuation, or nearly so. In step 82 the pulse period is set equal to the value Pmin so that when a pulse is generated it will have period Pmin. Receipt of an interrupt is recognized in step 84 and then in step 86, the program waits for a short period, say 20 msec, sufficient to allow system response to valve actuation. If, at the expiration of the set time, a feedback response is not received (step 88) the pulse period Pmin is increased in step 90 so that a longer pulse will be applied at the next pulse event and the steps 82–88 are repeated. When a feedback is received, as determined in step 88, the magnitude of the position or pressure response is compared to a threshold in step 92. If the response does not exceed the threshold the pulse generation continues without further change in the pulse period Pmin, but if the response does exceed the threshold, the minimum pulse width Pmin is reduced in step 94 for the next pulse. By virtue of this program, whenever a pulse period is insufficient to successfully actuate the solenoid valve, the pulse period is increased until an adequate value is found, and should the pulse period increase too much it is reduced. Thus the pulse is assured to be of sufficient width to actuate the solenoid valve and yet is not allowed to release significantly above the minimum effective value.

It will thus be seen that the advantages of pulse frequency modulation can be fully exploited in torque transmitting devices of a vehicle power transmission system and that several techniques are available for implementation. The pulse frequency modulation allows very short pulses of solenoid operation resulting in smooth changes in actuator pressure and thus clutch or brake position and further resulting in fine resolution which enables a higher degree of control.

The same ability to assure minimum effective pulses is useful in pulse width modulation systems operating at very low duty cycles. By invoking the minimum pulse activation when small control errors are present the finest control resolution can be attained, and the larger pulse widths of higher duty cycles, when they occur, supersede the minimum values.

Figure 8:
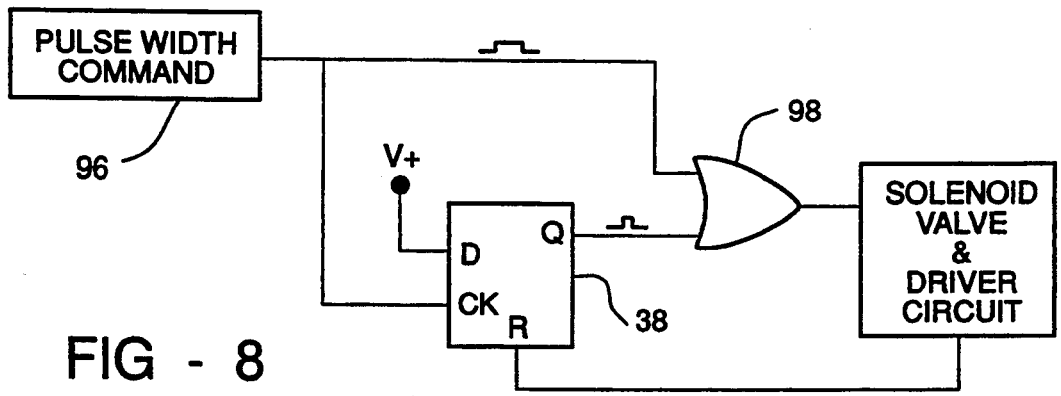
FIG. 8 is a schematic of a circuit for implementing the invention for pulse width modulation controls.

FIG. 8 illustrates a hardware approach to pulse width modulation which applies to either the FIG. 4 or the FIG. 5 circuit. A pulse width modulated signal from a controller 96 is applied to the clock input of a flip-flop 38 and to one input of an OR gate 98. The Q output of the flip-flop is also coupled to the OR gate input so that the OR gate output is the longer of the modulated signal on period or the Q output period. The OR gate output is connected to operate the solenoid driver and hence the solenoid valve and the feedback to the flip-flop reset insures that the Q output is terminated as soon as the valve movement occurs, as described above. Thus if the pulse width input from the controller 96 is very short the flip-flop arrangement assures that the valve will be operated for the shortest possible time, but if the input is for a longer time, the valve will be actuated for the longer period.

Figure 9:
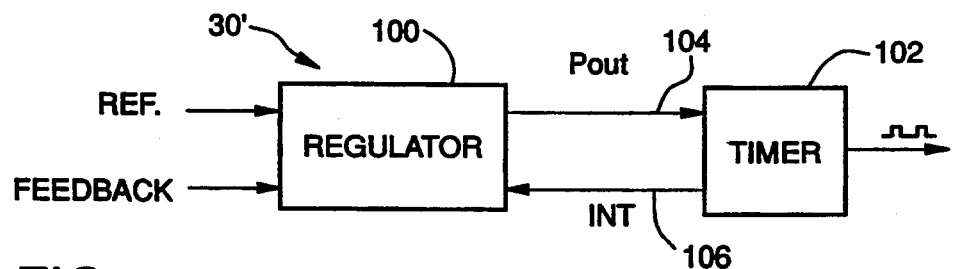
FIG. 9 is a schematic diagram of the electrical control of FIG. 6.
Figure 10:
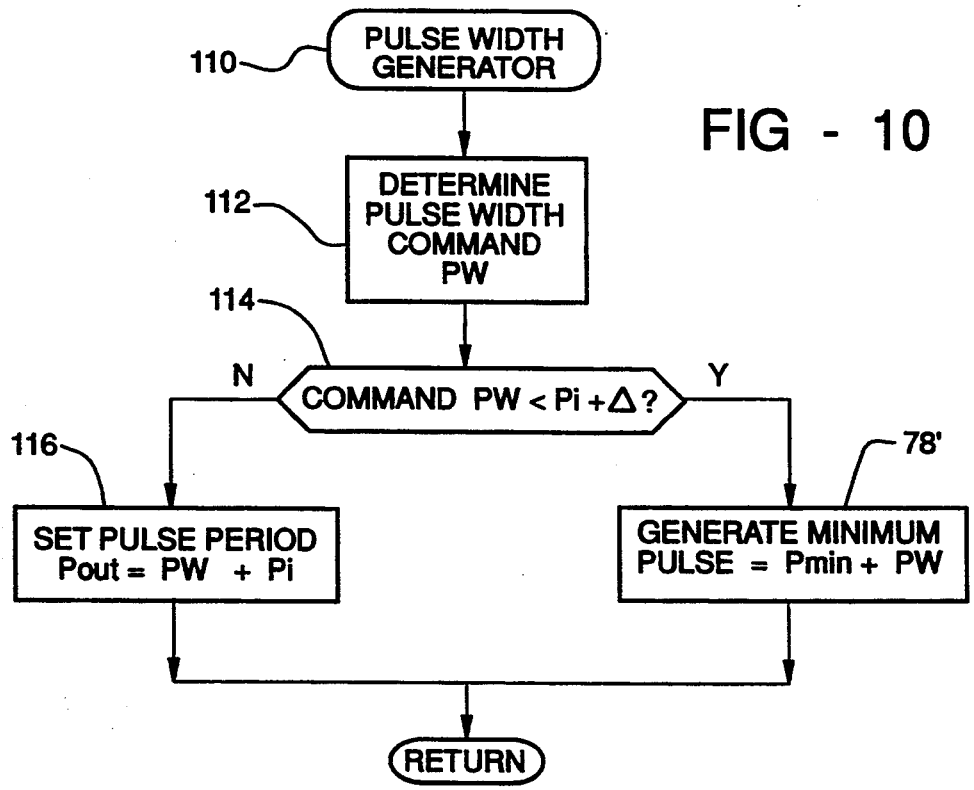
FIG. 10 is a flow diagram of a computer program for applying the control of FIG. 6 and the program of FIG. 7 to pulse width modulation controls.

The software approach for pulse width modulation employed in the apparatus of FIG. 6 is best understood by understanding that the control 30' comprises a computer-based control or regulator 100 and timer 102 interconnected by lines 104 and 106 as shown in FIG. 9. The software resides in the regulator which compares the reference to a feedback signal to determine an error and to establish a pulse width signal on line 104 best suited to minimize or eliminate the error. The timer 102 emits pulses at a fixed frequency with pulse widths as commanded by the regulator 100. An interrupt signal is produced by the timer on line 106 at the beginning of each output pulse. In the regulator 100, the software routine 110 of FIG. 10 is executed. The first step 112 is to determine the pulse width command Pw for correction of the error. Then in step 114 it is decided whether the command Pw is less than the value of the initial constant Pi plus some small increment Delta. Delta is chosen to assure the minimum assured pulse period will be calculated if the command Pw too small for reliable actuation of the valve. If Pw is less than Pi+Delta, the routine 78' which is similar to the routine 78 of FIG. 7 is run to update the value of the smallest assured pulse width. The only difference between routines 78 and 78' is in step 82 where the pulse period is set to Pmin+Pw for routine 78'. The output pulse will thus be the smallest assured value Pmin+Pw. If, in step 114, the command Pw is not less than Pi+Delta, the value of Pout is set equal to Pw+Pmin. The value of Pmin becomes an offset which when combined with Pw in step 116 produces a linear change of Pout as Pw increases, and there is no discontinuity in pulse width calculation upon change from routine 78' to step 116.

Thus both pulse width modulation and pulse frequency modulation benefit from the control of small commanded pulses in a manner to assure that they are not too small to be effective for valve control and at the same time are not unnecessarily large.

The embodiments of the invention in which an exclusive property or privilege is claimed are defined as follows:

1. In apparatus for transmitting torque from an engine to wheels of a vehicle, a torque transmitting device actuated by fluid pressure under electronic control, a control comprising:

a source of fluid under pressure;

actuator means responsive to fluid pressure for actuating a torque transmission function;

solenoid valve means subject to an electrical input signal for coupling fluid from the source to the actuator means;

electrical means coupled to the solenoid valve means for generating a pulse frequency modulated signal, the signal having short on pulses for actuating the solenoid valve means for minimum valve opening time, whereby the fluid is admitted to the actuator means in small increments; and wherein the electrical means includes means for verifying valve actuation.

2. The invention as defined in claim 1 wherein each pulse provides valve actuation force and wherein:

the electrical means includes a circuit for sustaining valve actuation force until valve actuation is verified.

3. The invention as defined in claim 1 wherein the means for verifying valve actuation comprises means responsive to valve movement.

4. The invention as defined in claim 1 wherein the on pulses are substantially equal in period and the period is just long enough to effect valve actuation, and wherein the electrical means includes a frequency control of the pulses to effect a desired valve actuation duty cycle.

5. The invention as defined in claim 1 wherein valve actuation is initiated by each on pulse and wherein the solenoid valve means produces a back-emf signal upon valve actuation; and the means for verifying valve actuation comprises a circuit responsive to the back-emf signal for terminating valve actuation.

6. The invention as defined in claim 1 wherein the electrical means includes:

a computer-based controller for supplying pulses of predetermined width sufficient to cause small increments in the actuator response;

the means for verifying valve actuation comprises feedback means for sensing an actuator parameter responsive to the admission of fluid and generating a feedback signal; and the computer-based controller is coupled to the feedback means and includes means for increasing the width of supplied pulses upon failure to receive a feedback signal.

7. The invention as defined in claim 6 wherein the feedback means includes a position sensor coupled to the actuator for generating the feedback signal in response to actuator movement.

8. The invention as defined in claim 6 wherein the feedback means includes a pressure sensor coupled to the actuator for generating the feedback signal in response to change in actuator pressure.

9. In apparatus for transmitting torque from an engine to wheels of a vehicle, a torque transmitting device actuated by fluid pressure under electronic control, a control comprising:

a source of fluid under pressure;

actuator means responsive to fluid pressure for actuating a torque transmission function;

solenoid valve means subject to an electrical input signal for coupling fluid from the source to the actuator means;

electrical means coupled to the solenoid valve means for generating a pulse modulated signal, the signal having an on pulse for actuating the valve means for minimum valve opening time, wherein each pulse provides valve actuation force; and the electrical means including means for verifying valve actuation.

10. The invention as defined in claim 9 wherein the electrical means includes a circuit for sustaining valve actuation force until valve actuation is verified.

11. The invention as defined in claim 9 wherein the signal is pulse width modulated; and the electrical means includes means for sustaining valve actuation at least until termination of the on pulse.

12. The invention as defined in claim 9 wherein the on pulse has a width which is dependent on the desired valve actuation duty cycle, and wherein the electrical means includes a width control of the pulses to effect a desired valve actuation duty cycle.

13. The invention as defined in claim 9 wherein the electrical means includes:

a computer-based controller for supplying pulses of minimum width sufficient to cause small increments in the actuator response;

the means for verifying valve actuation comprises feedback means for sensing an actuator parameter responsive to the admission of fluid and generating a feedback signal; and the computer-based controller is coupled to the feedback means and includes means for increasing the width of supplied pulses upon failure to receive a feedback signal.

14. In a transmission having electronic circuitry for actuating the transmission through fluid pressure; a control comprising:

a source of fluid under pressure;

actuator means responsive to fluid pressure for actuating a transmission function;

solenoid valve means subject to an electrical input signal for coupling fluid from the source to the actuator means;

an electrical circuit including a pulse generator for producing a pulse frequency modulated signal, an actuating circuit responsive to the signal for supplying actuating current to the solenoid valve means, and reset means coupled to the actuating circuit and responsive to back-emf generated due to solenoid movement for terminating the actuating current.

15. The invention as defined in claim 14 wherein the actuating circuit is responsive to each pulse of the signal for supplying actuation current to the solenoid valve means.

16. The invention as defined in claim 14 wherein the actuating circuit includes a flip-flop circuit which is set to an on state in response to the signal and which has a reset function; and the reset means is coupled to the flip-flop circuit for producing a reset signal for resetting the flip-flop to an off state.

17. The invention as defined in claim 16 wherein the reset means comprises a coil coupled to the solenoid valve means for detecting back-emf and producing a reset signal.

18. The invention as defined in claim 16 wherein the reset means comprises a current sensor circuit subject to the actuating current and responsive to the effects of back-emf for producing a reset signal.

19. In an automotive vehicle, the method of controlling a torque transmitting device by a fluid actuator wherein the actuator is coupled to a pressurized fluid source by a solenoid valve, comprising the steps of:

applying a pulse modulated signal having a pulse period to the solenoid valve for pulsed valve actuation;

developing a feedback signal upon each valve actuation; and controlling the pulse period to minimize the period and verifying via the feedback signal that the period is sufficient for valve actuation.

20. The invention as defined in claim 19 wherein the step of developing a feedback signal comprises sensing back-emf developed in the solenoid valve due to valve movement.

21. The invention as defined in claim 20 wherein the signal is pulse frequency modulated and the step of controlling the pulse period comprises terminating the pulse upon receipt of the feedback signal.

22. The invention as defined in claim 19 wherein the signal is pulse width modulated and the step of controlling the pulse period comprises initiating the pulse by a width-controlled command signal and terminating the pulse upon receipt of the feedback signal and termination of the command signal.

23. The invention as defined in claim 19 wherein the step of controlling the pulse period comprises at least initially producing a short period pulse and, if valve actuation is not verified by the feedback signal, increasing the pulse period for subsequent pulses.

24. The invention as defined in claim 23 wherein the step of developing a feedback signal comprises sensing movement of the fluid actuator resulting from valve actuation.

25. The invention as defined in claim 23 wherein the step of developing a feedback signal comprises sensing pressure change in the fluid actuator resulting from valve actuation.

* * * * *